Patented Sept. 25, 1945

2,385,661

UNITED STATES PATENT OFFICE 2,385,661

POLYMERS FROM DIOXANE

Gordon T. Vaala, Wilmington, Del., and Robert B. Carlin, Champaign, Ill., assignors to E. I. du Pont de Nemours & Company, Wilmington, Del., a corporation of Delaware No Drawing. Application October 21, 1942, Serial No. 462,830

6 Claims. (Cl. 260—2)

This invention relates to new polymeric materials and more particularly refers to polymeric materials derived from 6-membered cyclic acetals and processes for their production and use.

Heretofore, valuable products have been obtained by polymerizing ethylene oxide to a polymeric material. Similarly, polyformals and polyacetals have been obtained by reacting 1,4-glycols or glycols in which the hydroxy groups are separated by four or more carbon atoms, with formaldehyde or other aldehydes. It has been possible to convert these polyformals to synthetic fibers having properties comparable with the natural fibers and to prepare unsupported films. The 5-membered cyclic acetal, 1,3-dioxolane, has also been converted to high molecular weight polymers. However, the monomeric cyclic acetals derived from 1,3-glycols and aldehydes or ketones have shown no tendency to polymerize. The view has generally been accepted that the 6-membered ring represents a very stable configuration, and the preparation of polymeric materials from 6-membered cyclic acetals was quite improbable.

It is an object of this invention to produce polymeric materials from 6-membered heterocyclic ring compounds containing at least two chalcogen atoms. A further object is to produce new polymeric materials which are particularly adapted for conversion to molded articles. A still further object is to produce materials which are useful for the improvement of lacquers, varnishes and shellacs. A still further object is to produce products which are of considerable value as modifying agents for prior art resinous materials. A still further object is to produce by a simple and economical process new polymeric materials from prior art compounds which were not believed to be capable of polymerization. A still further object is to produce polymeric derivatives of 1,3-dioxanes. Additional objects will become apparent from a consideration of the following description and claims.

These objects are attained in accordance with the present invention wherein polymeric materials are produced by cleaving a 6-membered heterocyclic ring containing at least two chalcogen atoms and polymerizing the cleavage products. In a still more restricted sense this invention is concerned with the treatment of 6-membered cyclic acetals with a catalyst or combination of catalysts which serve the dual purpose of cleaving the 6-membered ring and polymerizing the cleavage products. In a still more restricted sense this invention is directed to polymeric materials obtained by treating a 6-membered cyclic acetal in which the 1 and 3 heteroatoms are chalcogen of atomic weight less than 33 with a catalyst capable of cleaving the 6-membered ring and a catalyst capable of polymerizing the cleavage products, said treatment being carried out at elevated temperatures and for a sufficient period of time to accomplish the desired result. In a still more restricted sense this invention pertains to the treatment of 1,3-dioxane and/or its derivatives with a mixture of catalysts one of which is capable of cleaving the dioxane ring and the other of which is capable of polymerizing the cleavage products, said treatment being carried out at elevated temperatures and for a sufficient period of time to obtain the desired cleavage and polymerization.

In a still more restricted sense this invention pertains to the treatment of 1,3-dioxane and/or its derivatives, particularly 4-methyl-1,3-dioxane, with cleavage catalysts such as acid halides, alkyl sulfates, hydrogen halides, phosphorus halides, and subjecting the so-produced cleavage products to polymerizing condition in the presence of polymerization catalysts of the Friedel and Crafts type. In one of its preferred embodiments this invention is concerned with the treatment of 4-methyl-1,3-dioxane and/or its derivatives with a mixture of catalysts one of which is boron-trifluoride and the other of which is a chloride capable of cleaving said dioxane, such as acetyl chloride or hydrogen chloride, said treatment being carried out within the temperature range of about 25° C. to about 200° C. for a period of some several hours to several days. Additional embodiments of this invention comprise the employment of the foregoing products in the chemical arts.

In accordance with this invention it has been found that 6-membered heterocyclic rings containing at least two chalcogen atoms such as 1,3-dioxanes and 1,3-dithianes, can be readily converted to polymeric products by heating the monomer in the presence of a catalyst mixture comprising a small amount of a material capable of cleaving the 6-membered ring and a material capable of polymerizing the cleavage products.

The catalyst system employed to achieve the objectives of this invention is unique in several respects. By means of it compounds which were heretofore considered to be so stable that they were immune to polymerization reactions are converted to desirable polymeric materials. These compounds should advisably contain a chalcogen whose atomic weight is less than 33 in the 1 and 3 positions. The catalyst system employed herein is unique for the further reason that it serves dual and highly specific purposes. It must produce both cleavage of the ring and polymerization of the cleavage products. A catalyst or combination of catalysts which serve either of these purposes, but not both, would be unsatisfactory herein. The catalyst system hereinafter referred to in detail possesses the dual properties required for the achievement of the desirable objectives previously mentioned.

Polymerization may be accomplished by several optional procedures. For example, the polymerization catalyst may be dissolved in a solvent in which the monomer is soluble. The monomer is then added to this solution and finally a cleavage catalyst is added thereto. The mixture may then be heated at reflux temperature until polymerization is effected. Chloroform has been found to be a very satisfactory solvent for polymerization, particularly where a lower reflux temperature is desired. Another possible procedure is to dissolve the polymerization catalyst directly in the monomer to be polymerized, then add a small amount of the cleavage catalyst thereto. Thereafter, the mixture is heated at reflux temperature until polymerization of the desired degree is effected. Polymeric materials produced in accordance with this latter procedure are generally less soluble in organic solvents than those produced from the former procedure.

The invention may be more readily understood by a consideration of the following illustrative examples wherein the quantities are stated in parts by weight.

Example I

A solution comprising 85 parts of boron trifluoride, 265 parts of acetic acid, 125 parts of 4-methyl-1,3-dioxane, and 1 part of acetyl chloride is refluxed for 2 days. During heating the mixture gradually darkens and becomes very viscous. Occasionally some solids precipitate during the latter stages of heating. The reaction mixture is cooled and diluted with an equal volume of water. During dilution a precipitate is obtained which is filtered, washed well with water, and dried to constant weight. Seventy-five (75) parts of a light tan powder is obtained which softens at 140° C. and is soluble in common halogenated hydrocarbon solvents. Analysis of the material shows that it contains 68.45% carbon and 7.65% hydrogen, and has a molecular weight of 800, as determined by ebullioscopic method in chloroform (Glasstone, "Textbook of Physical Chemistry" D. Van Nostrand Co., Inc. (1940) pp. 627–628). Films flowed from solutions of this material are clear and hard after air drying.

Example II

A solution comprising 13 parts of boron trifluoride, 12 parts of methanol, 25 parts of 4-methyl-1,3-dioxane, and 0.1 part of hydrogen chloride is refluxed for 2 hours. At the end of this time a considerable amount of solid material has precipitated. After cooling the reaction mixture, the solid material is broken up, filtered, and washed well with water. The powdered polymeric material is then digested with 50 parts of a 10% sodium carbonate solution, to remove excess boron trifluoride, filtered, washed, and dried to constant weight. Thirteen (13) parts of solid polymeric material is obtained which is soluble in chlorinated hydrocarbons and softens on heating at 110° C. On molding this material at 160° C. and 10,000 lbs./sq. in. pressure for 5 minutes, a hard molded but friable poker chip is obtained.

Example III

A solution comprising 25 parts of 4-methyl-1,3-dioxane, 25 parts of chloroform, 7 parts of boron trifluoride, and 1 part of acetyl chloride is heated at reflux for 24 hours. At the end of this time the solution is very viscous. To the solution is added 200 parts of 10% sodium hydroxide solution and the mixture is heated to remove the boron trifluoride. After the heating period, the layers are allowed to separate, and the aqueous layer removed. The chloroform solution is concentrated by distillation, and on dilution of the concentrated solution with low-boiling petroleum ether, 5 parts of a solid powdery polymer is obtained. The polymer is soluble in halogenated hydrocarbon solvents and softens on heating at 210° C.

Example IV

A solution comprising 7 parts of boron trifluoride, 50 parts of 4-methyl-1,3-dioxane, and 1 part of acetyl chloride is refluxed for 5 hours. During reflux the solution becomes dark and very viscous, and near the end a sizable quantity of solid material is precipitated. The solids are broken up and then digested with a 10% sodium carbonate solution to remove the boron trifluoride. After cooling the mixture, it is filtered, and the solids are well washed with water. After drying to constant weight, 31 parts of a red-brown polymer is obtained which is only partially soluble in organic solvents and softens on heating at 225° C.

Example V

A solution comprising 60 parts of 4-methyl-1,3-dioxane, 11 parts of stannic chloride, and 1 part of acetyl chloride is refluxed for 72 hours. During reflux, the solution gradually becomes viscous, and near the end of the reflux period considerable quantities of solids are precipitated. The solid precipitate is broken up, and digested with 10% sodium hydroxide solution. The cooled mixture is filtered, well washed with water, and dried to constant weight. In this manner 39 parts of a light tan powder is obtained which does not soften on heating to 360° C. and is insoluble in organic solvents. An analysis showed that the polymer contained 66.9% carbon and 7.31% hydrogen.

Example VI

A mixture of 10 parts of zinc chloride, 1 part of concentrated hydrochloric acid, and 50 parts of 4-methyl-1,3-dioxane is refluxed for 18 hours. At the end of this time most of the mixture comprises a solid material. The solids are broken up and refluxed with a 10% sodium hydroxide solution. The cool mixture is then filtered, and the precipitate washed well with water and dried to constant weight. In this manner 14 parts of a light brown solid is obtained which softened on heating at 130° C. and is partially soluble in chloroform.

Example VII

A solution of 17 parts of boron trifluoride, 1 part of acetyl chloride and 22 parts of 1,3-dioxane in 90 parts of acetic acid is refluxed under nitrogen for 72 hours. During reflux the solution gradually becomes dark and slightly viscous. The solution is cooled and added to 1 liter of cold water. A gelatinous precipitate separates on dilution. The mixture is centrifuged and the supernatant liquid removed by decantation. The precipitate is then dissolved in chloroform and washed with sodium bicarbonate solution to remove boron trifluoride and acidic material. After removal of the aqueous phase, the chloroform solution was concentrated and, on dilution with petroleum ether 15 g. of a viscous brown liquid polymer is obtained.

It is to be understood that the foregoing examples are illustrative merely of a few of the many embodiments to which this invention is susceptible. They may be varied widely with respect to the individual reactants, the amount thereof and the conditions of reaction without departing from the scope hereof.

Monomeric materials contemplated for use herein are 6-membered heterocyclic rings containing at least two chalcogen atoms. For optimum results over a wide range of conditions it is advisable to select compounds wherein the chalcogen atoms have an atomic weight less than 33 and furthermore wherein they are present in the 1 and 3 positions on the monomer. The majority of compounds falling within this category may be represented by the following general formula:

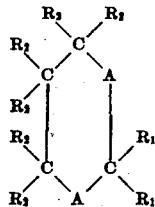

wherein $R_1$ represents hydrogen, alkyl, aralkyl, and aryl groups which may be the same or dissimilar; $R_2$ represents hydrogen, alkyl, aralkyl and aryl groups which may be the same or dissimilar; and A represents a chalcogen whose atomic weight is less than 33, particularly oxygen or sulfur, and preferably the former.

These compounds may be obtained conveniently by the reaction of a 1,3-glycol or a 1,3-thiol with a compound containing a carbonyl group, such as aldehydes and ketones. The hydroxy compounds which may be used all belong to the group in which the two hydroxyl groups are separated by a chain of three carbon atoms. This group, for example, will consist of glycerol, trimethylene glycol, 1,3-butylene glycol, 2-methyl propanediol-1,3, pentanediol-1,3, pentanediol-2,4, 2,2-dimethyl propanediol-1,3, 2 ethyl propanediol-1,3, 2-methyl butanediol-1,3, 3-methyl butanediol-1,3, erythritol, pentaerythritol, the various pentitols, hexitols, and resorcinols in which there are situated two hydroxy groups separated by a chain of three carbon atoms. The dithiols operable under this invention are compounds containing two thiol groups separated by a chain of three carbon atoms. These include propanedithiol-1,3, butanedithiol-1,3, pentanedithiol-2,4, 2-ethyl-hexanedithiol-1,3, thioresorcinol, and the thiol analogues of the glycols enumerated above.

Polymerization catalysts which may be used herein are commonly referred to as Friedel and Crafts type catalysts. For purposes of illustration, mention may be made of those such as boron trifluoride, stannic chloride, aluminum chloride, aluminum bromide, zinc chloride, ferric chloride, antimony pentachloride, antimony trichloride, titanium trichloride, titanium tetrachloride, zirconium tetrachloride, and mercuric chloride.

Cleavage catalysts are, for the most part, acidic materials, preferably containing anions of strong acids. Among these materials mention may be made of acid halides—for example, chlorides of acetic, propionic and butyric acids; alkyl sulfates—for example, dimethyl sulfate; hydrogen halides—for example, hydrochloric acid; as well as phosphorus halides and oxyhalides.

It is contemplated, of course, that one or more polymerization catalysts and/or one or more cleavage catalysts may be employed. Likewise it is contemplated that one or more 6-membered heterocyclic ring compounds may be utilized. By a proper combination of monomers and/or catalysts it is frequently possible to improve further the desirable characteristics of the resulting polymeric materials.

The amount of polymerization catalyst based upon the amount of monomer to be polymerized, will generally vary from about 5% to about 100%. For optimum results, it is in most cases within the range of 20% to 70%. The amount of cleavage catalyst, based upon the amount of polymerization catalyst, will ordinarily fall within the range of about 0.1% to about 20.0%. Most satisfactory results are usually obtained by employing an amount within the range of 0.5% to 5.0%. It is understood, of course, that the foregoing ranges are in no sense critical since they are dependent to a large extent upon the particular monomer or monomers to be treated, the particular catalyst or catalysts selected for treatment and the characteristics which it is desired to impart to the final product.

As a general rule the temperature at which the heretofore described treatment is carried out will be within the range of about 25° C. to about 200° C., although it should be understood that this range may be exceeded on either side without departing from the scope of the invention. The preferred range for the majority of treatments is the reflux temperature of the particular system undergoing treatment. This is ordinarily from about 60° C. to about 115° C.

As in the case of the preceding factors the time of treatment will depend to a great extent upon the materials undergoing treatment and the characteristics desired for the final products. The time will generally vary from a matter of several hours to several days.

Solvents may or may not be employed, although their use is ordinarily advisable when a product more soluble in organic solvents is desired. The solvents which are satisfactory for use herein are well known in the art and need not be described in detail, although for purposes of illustration mention may be made of acetic acid, chloroform, methanol, and the like.

It should also be understood that this invention contemplates the incorporation of one or more assistants in the reactants either prior to or during reaction. By means of this feature the reaction may be appreciably improved and/or the characteristics of the resulting products may likewise be improved. Assistants which are contemplated for use in this connection are, for instance, acetyl chloride, hydrogen chloride, phosphorus oxychloride, dimethyl sulfate, and the like.

Polymeric materials produced in accordance herewith are advisably freed of the reactants before use. This may be accomplished as in the foregoing examples by washing with alkaline materials such as sodium carbonate and sodium hydroxide. It may likewise be accomplished by treatment with suitable organic solvents or any of the other treatments known or described in the art for the preparation of polymeric materials prior to their ultimate utilization.

These products are particularly adapted for use in lacquers, varnishes and shellacs, since they impart thereto a hard, glossy, water-resistant finish. Likewise they may be employed as modifying agents for prior art resins such as urea-formaldehyde resins, phenol-formaldehyde resins, nitrocellulose resins, cellulose acetate resins, polyvinyl resins, resins derived from the polymerization of acrylic acid and its derivatives, glyptal type resins, etc. By incorporating one or more of the products of the present invention in resins of the foregoing and related type, their desirable properties are appreciably enhanced. Polymeric materials of the present invention are likewise of advantage in drying oil alkyds since their incorporation therein provide a means of formulating fast-drying coating compositions without resorting to the conventional inorganic driers. Furthermore, these materials also serve to minimize or eliminate entirely wrinkling of drying oil-alkyds.

As many apparently widely different embodiments of this invention may be made without departing from the spirit and scope thereof, it is to be understood that the invention is not limited to the specific embodiments thereof except as defined in the appended claims.

We claim:

1. A process for producing polymeric materials which consists in cleaving with an acidic material containing an anion of a strong acid selected from the class consisting of chlorides of saturated fatty acids containing no more than four carbon atoms and hydrogen chloride, a six-membered heterocyclic ring selected from the class consisting of 4-methyl-1,3-dioxane and 1,3-dioxane, then polymerizing the cleavage products with a Friedel-Crafts catalyst, the aforesaid reactions being carried out at temperatures between about 25° C. and about 200° C. and in the presence of the cleavage catalyst and of the polymerization catalyst.

2. A process which consists in cleaving 4-methyl-1,3-dioxane with a cleaving catalyst consisting of an acidic material containing an anion of a strong acid selected from the class consisting of chlorides of saturated fatty acids containing no more than 4 carbon atoms and hydrogen chloride, then polymerizing the cleavage products with a Friedel-Crafts catalyst, the aforesaid reactions being carried out at temperatures between about 25° C. and about 200° C. and in the presence of both the cleavage catalyst and the polymerization catalyst.

3. A process which comprises cleaving 4-methyl-1,3-dioxane with a cleavage catalyst consisting of acetyl chloride, then polymerizing the cleavage products with boron trifluoride, the aforesaid reactions being carried out at the refluxing temperature of the reactants and in the presence of both the cleavage catalyst and the polymerization catalyst.

4. Polymeric materials produced in accordance with the process of claim 1.

5. Polymeric materials produced in accordance with the process of claim 2.

6. Polymeric materials produced in accordance with the process of claim 3.

GORDON T. VAALA.
ROBERT B. CARLIN.